(12) United States Patent
Fujimoto et al.

(10) Patent No.: US 7,209,346 B2
(45) Date of Patent: Apr. 24, 2007

(54) INFORMATION PROCESSING APPARATUS

(75) Inventors: Shingo Fujimoto, Tachikawa (JP); Keiji Kashima, Higashimurayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/263,837

(22) Filed: Nov. 2, 2005

(65) Prior Publication Data

US 2006/0034049 A1  Feb. 16, 2006

Related U.S. Application Data

(63) Continuation of application No. PCT/JP04/18735, filed on Dec. 15, 2004.

(30) Foreign Application Priority Data

Dec. 25, 2003  (JP) .............................. 2003-431453

(51) Int. Cl.
*G09F 1/16* (2006.01)
(52) U.S. Cl. ...................................... 361/685; 361/724
(58) Field of Classification Search ................ 361/685, 361/724–727
See application file for complete search history.

(56) References Cited

U.S. PATENT DOCUMENTS 5,349,483 A * 9/1994 Tsai ........................... 361/685

6,233,142 B1 * 5/2001 Kerrigan et al. ............ 361/685
6,282,087 B1 * 8/2001 Gibbons et al. ............ 361/685
6,317,334 B1 * 11/2001 Abruzzini et al. .......... 361/685
6,590,775 B2 * 7/2003 Chen .......................... 361/725

FOREIGN PATENT DOCUMENTS

JP     09-130067      5/1997
JP     3094615 U      4/2003

OTHER PUBLICATIONS

International Search Report dated Apr. 19, 2005 for PCT/JP2004/018735.

* cited by examiner

*Primary Examiner*—Lisa Lea-Edmonds
(74) *Attorney, Agent, or Firm*—Pillsbury Winthrop Shaw Pittman, LLP

(57) ABSTRACT

An information processing apparatus has a disk shuttle to mount a magnetic disk unit, a main body case to contain at least one disk shuttle, a connector of magnetic disk provided at the insertion end of the disk shuttle inserted from one side of the main body case, a connector of a main body provided in the other side of the main body case and fitted with the connector of the magnetic disk, a back plane to be fixed with the connector of the main body, an tenon formed at the insertion end of the disk shuttle and extending toward the back plane, and a mortise formed in the back plane to be fitted with the tenon, thereby locking the movement in the direction transverse to the inserting direction of disk shuttle.

8 Claims, 6 Drawing Sheets

INFORMATION PROCESSING APPARATUS

CROSS REFERENCE TO RELATED APPLICATIONS

This is a Continuation Application of PCT Application No. PCT/JP2004/018735, filed Dec. 15, 2004, which was published under PCT Article 21(2) in Japanese.

This application is based upon and claims the benefit of priority from prior Japanese Patent Application No. 2003-431453, filed Dec. 25, 2003, the entire contents of which are incorporated herein by reference.

BACKGROUND OF THE INVENTION

1. Field of the Invention

The present invention relates to an information processing apparatus which has a disk shuttle to mount a magnetic disk unit and a main body case to contain the disk shuttle.

2. Description of the Related Art

There is a hard disk case to contain a magnetic disk unit. The hard disk case is used to mount a magnetic disk unit in an information processing apparatus such as a personal computer. The hard disk case has a disk shuttle to mount a magnetic disk unit, and a cage to insert the disk shuttle. An example of the hard disk case has been disclosed in Jpn. Registered UM Publication No. 3094615. The disk shuttle is inserted deep into the cage to connect the connector of a magnetic disk unit to the connector of an information processing apparatus.

However, in an information processing apparatus, a clearance is formed between the disk shuttle and cage to insert the disk shuttle smoothly. The disk shuttle is fixed to the information processing apparatus by fitting the connectors of magnetic disk and main body. In the state that the disk shuttle is fixed as described above, all loads such as vibrations of the magnetic disk unit are transmitted to the connectors. Further, as a clearance is formed between the disk shuttle and cage, the load by twisting may be transmitted to the connectors when connecting and disconnecting the disk shuttle. Thus, the connectors and the portion attaching the connectors to a board with the connectors mounted thereon are easy to be damaged.

In addition, there has been a tendency to use small connectors in order to reduce the size of the whole information processing apparatus. This is apt to concentrate the loads to the connectors furthermore. Thus, it has been necessary to provide a reinforcement to receive the loads applied to the connectors, such as, to provide a rail with minimized looseness. However, if a rail is additionally provided, the size of the whole information processing apparatus is rather increased.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
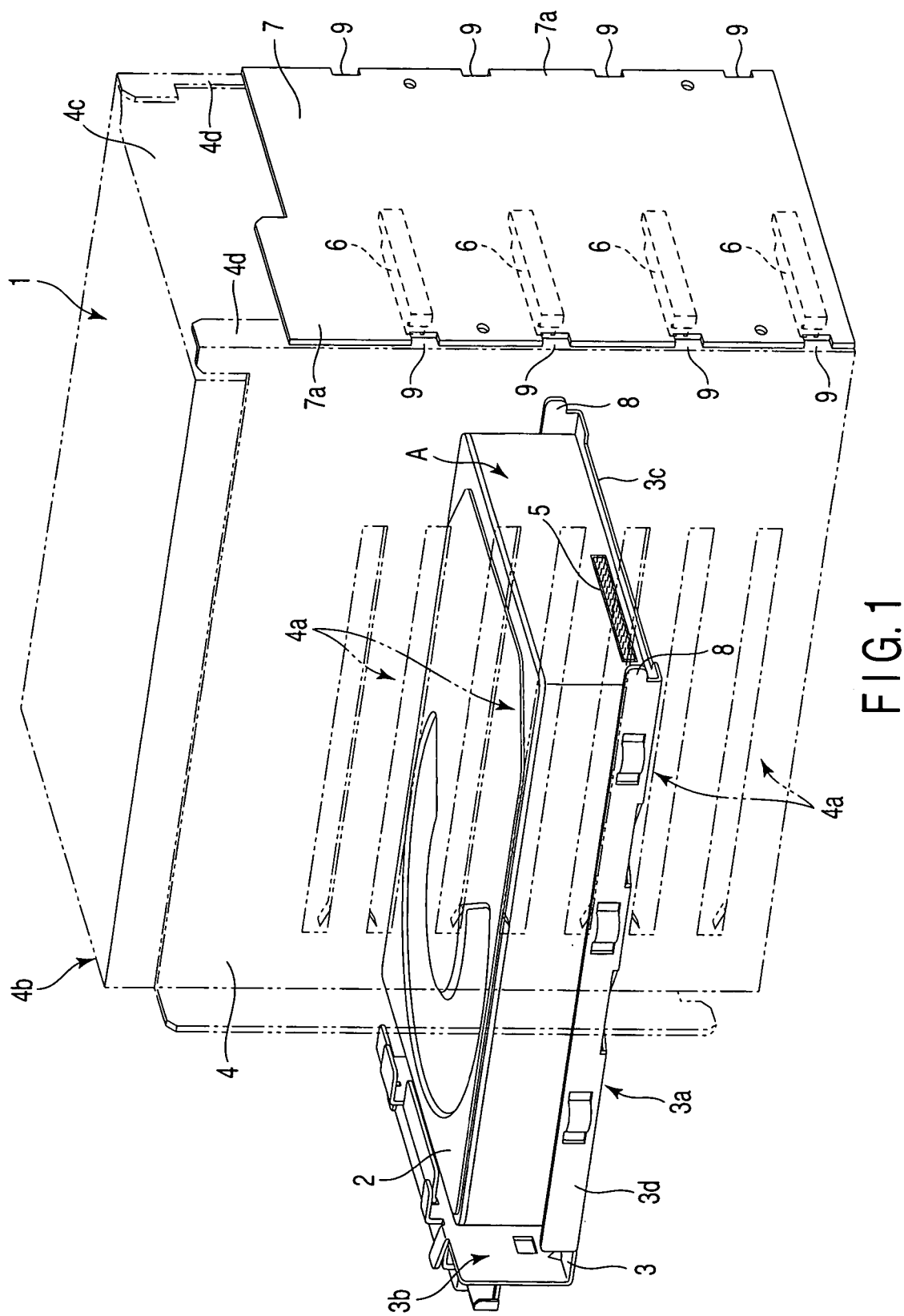
FIG. 1 is a perspective view showing an information processing apparatus according to a first embodiment of the present invention.

An information processing apparatus 1 according to a first embodiment of the present invention will be described with reference to FIGS. 1 to 6.

The information processing apparatus 1 has a magnetic disk unit 2, a disk shuttle 3, a main body case 4, a connector 5 of the magnetic disk unit, a connector 6 of the main body, a back plane 7, a tenon 8, and a mortise 9. In order to clarify the relationship among the magnetic disk unit 2, disk shuttle 3 and back plane 7 of the information processing apparatus 1, the main body case 4 is indicated by a chain double-dashed line in FIG. 1.

The magnetic disk unit 2 is formed as a rectangular parallelepiped, and mounted on the disk shuttle 3. The disk shuttle 3 has a tray 3a and a lever 3b. The magnetic disk unit 2 is fixed to the tray 3a. The lever 3b is gripped when inserting and removing the disk shuttle 3 into/from the main body case 4. The tray 3a has a panel portion 3c and a slide portion 3d. The panel portion 3c is formed flat along the magnetic disk unit 2. The slide portion 3d is formed just like rising continuously from the panel portion 3c at both edges of the tray 3a that are the both sides along the inserting direction of disk shuttle 3.

Figure 2:
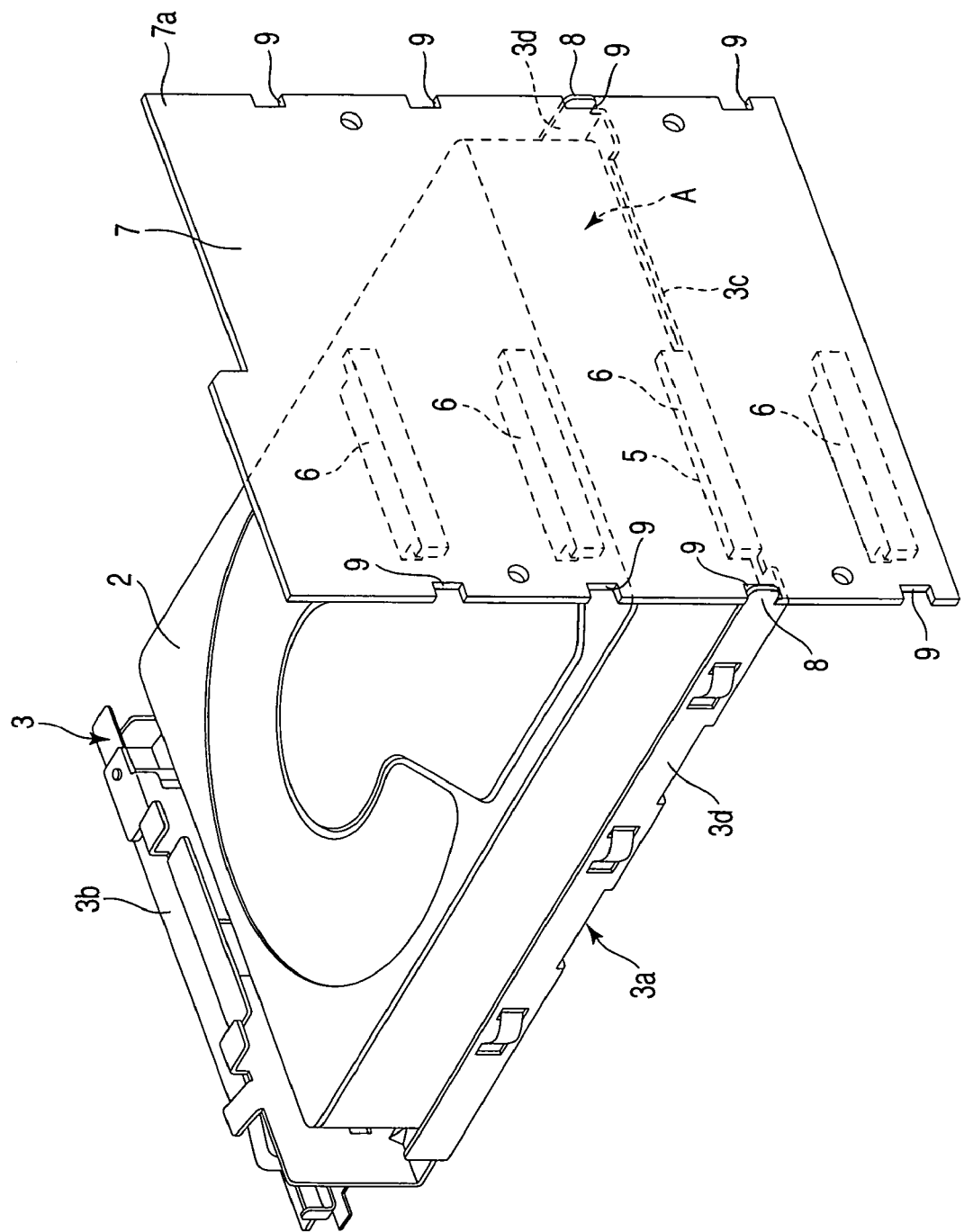
FIG. 2 is a perspective view of a disk shuttle and back plane of the information processing apparatus shown in FIG. 1.
Figure 3:
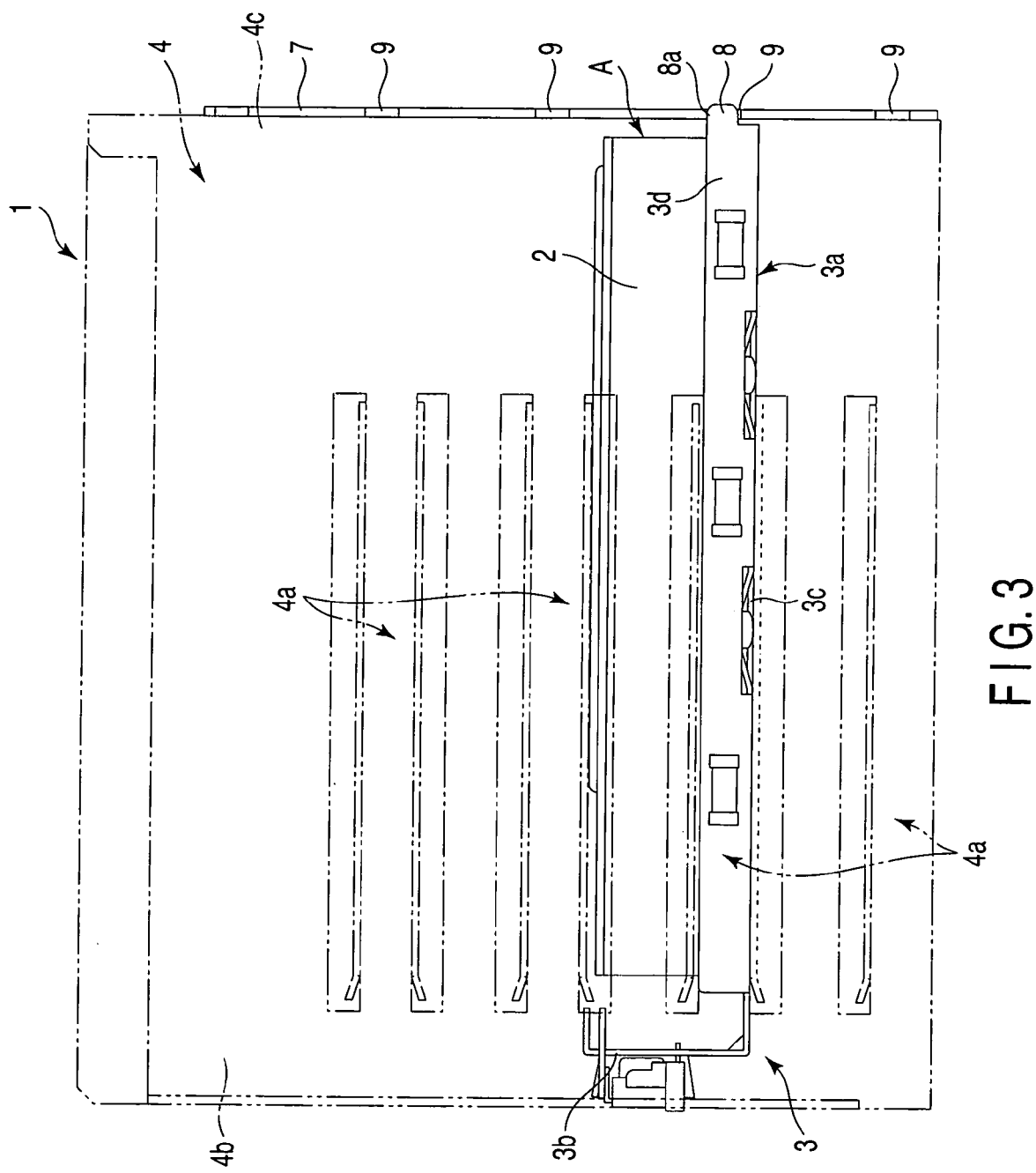
FIG. 3 is a side view of the disk shuttle and back plane of the information processing apparatus shown in FIG. 1.

The main body case 4 is configured to contain at least one disk shuttle 3, four in this embodiment, as shown in FIGS. 1–3. The main body case 4 has a guide 4a that is loosely fit with the slide portion 3d. The connector 5 of the magnetic disk unit is provided in the outer circumference of the magnetic disk unit 2 that becomes the insertion end A when the disk shuttle 3 is inserted from one side of the main body case 4.

If the inserting side of the disk shuttle 3 is considered to be one side 4b, the back plane 7 is fixed to the other side 4c of the main body case 4. The back plane 7 is a board constituting a part of the circuit of the information processing apparatus 1. The connector 6 of the main body is mounted at the position corresponding to the connector 5 of the magnetic disk unit. The back plane 7 may be a board with the connector 6 of the main body mounted thereon.

Figure 4:
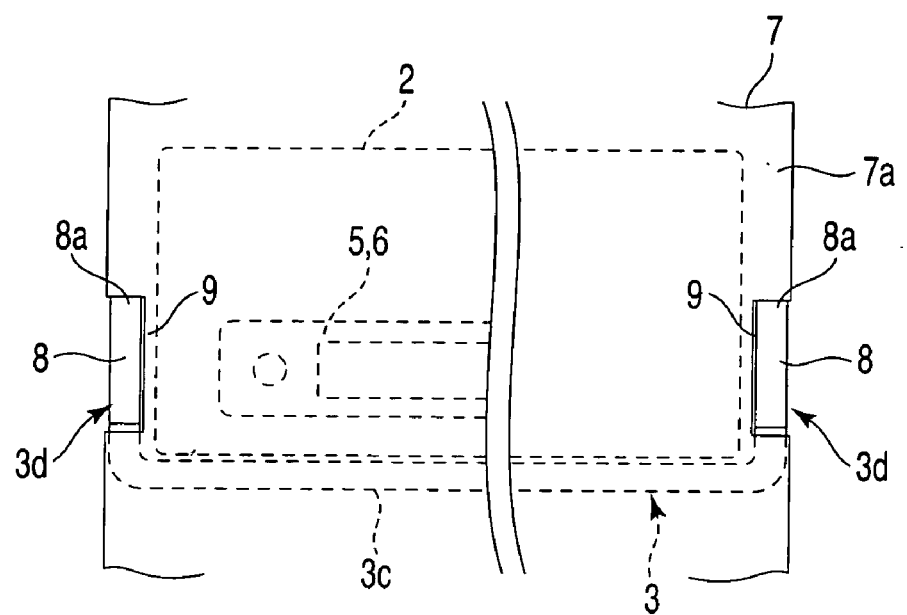
FIG. 4 is a front view of the engaged portion of the disk shuttle and back plane shown in FIG. 3, viewed from the back plane side.

The tenon 8 is formed along the slide portion 3d, and extended from the insertion end A of the slide portion 3d toward the back plane 7. The mortise 9 is formed at the position corresponding to the tenon 8 by cutting out the outer peripheral edge 7a. The mortise 9 is formed in a part of the side of the tenon 8 along the inserting direction of disk shuttle 3 in the state that the disk shuttle 3 is fit in the main body case 4, so as to come into contact with the end face 8a of the tenon 8 opposite to the side where the slide portion 3d is connected to the panel portion 3c, in this embodiment, as shown in FIG. 4.

Figure 5:
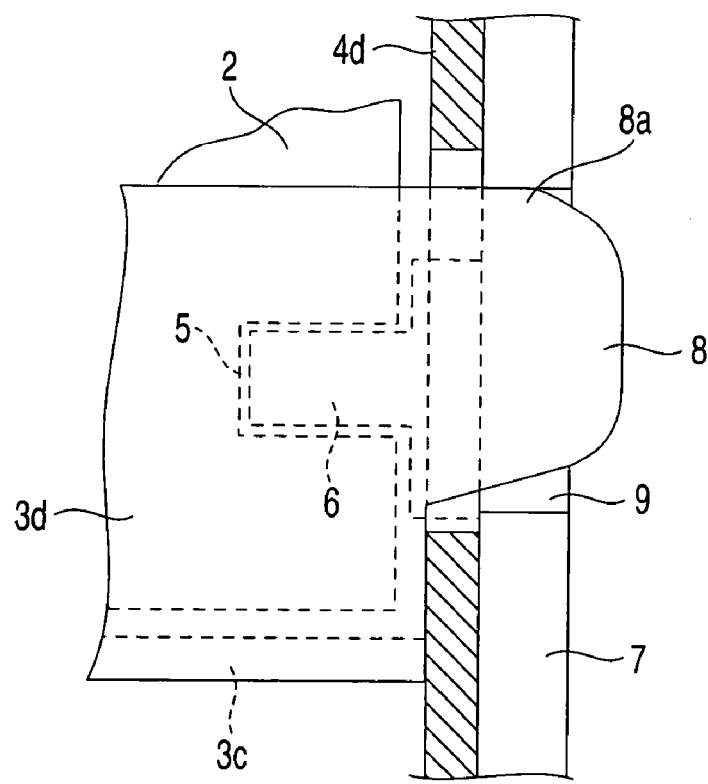
FIG. 5 is a magnified view of the engaged portion of the disk shuttle and back plane shown in FIG. 3.
Figure 6:
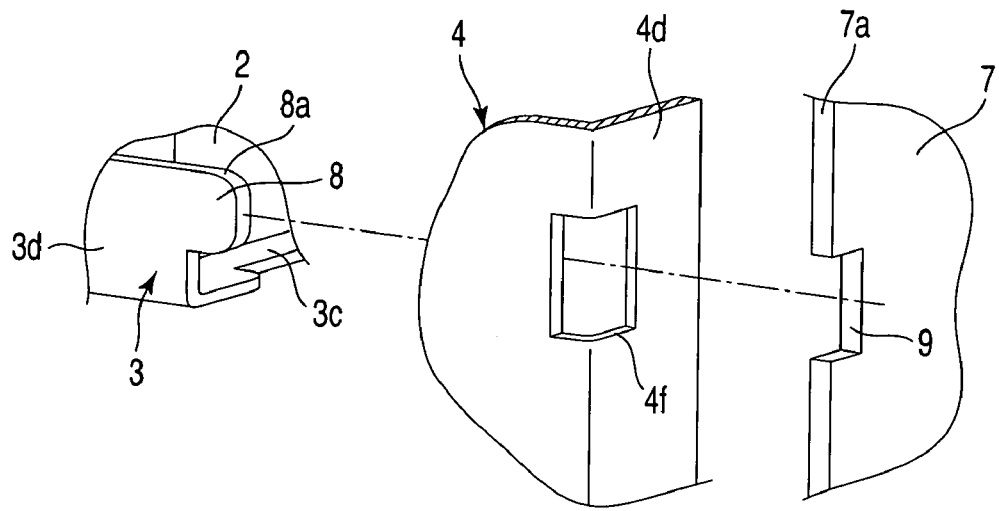
FIG. 6 is a magnified exploded perspective view of the engaged portion of the disk shuttle, case and back plate shown in FIG. 1.

In this embodiment, as shown in FIG. 1, the main body case 4 has a flange 4d to fit the back plane 7. The flange 4d is formed by bending inward the sidewall of the main body case 4, and has an insertion hole 4f to fit the tenon 8, as shown in FIG. 6. The insertion hole 4f is formed a little larger than the mortise 9 formed in the back plane 7, as shown in FIG. 5. It is permitted to form the insertion hole 4f to allow the inside wall to contact a part of the tenon 8, instead of fitting the tenon 8 in the mortise 9.

The information processing apparatus 1 configured as above is provided with the tenon 8 at the insertion end A of the disk shuttle 3. The disk shuttle 3 is fit in the state the tenon 8 contacts the mortise 9 formed in the back plane 7 containing the connector 6 of the main body. The disk shuttle 3 with the magnetic disk unit 2 mounted thereon is locked against the movement transverse to the inserting direction.

Therefore, the tenon 8 of the disk shuttle 3 and the mortise 9 of the back plane 7 can receive the loads generated upon insertion/removal of the disk shuttle 3 and the vibration during driving of the magnetic disk unit 2. This prevents concentration of loads to the connectors 5 and 6 of the magnetic disk unit and main body. By changing a part of the shapes of existing parts, the disk shuttle 3 can be fixed to the inside of the information processing apparatus 1 without adding a new part. This prevents increase in the size of the whole information processing apparatus 1. Therefore, it is possible to use a connector with smaller size and lower stiffness.

Next, an information processing apparatus 1 according to a second embodiment of the invention will be described with reference to FIG. 7 and FIG. 8. The components that have same functions as the information processing apparatus 1 according to the first embodiment will respectively applying the same reference symbols and may omit the description from followings. As a tenon 8 and a mortise 9 are different from the information processing apparatus 1 of the first embodiment, only these parts will be shown in the drawings.

Figure 7:
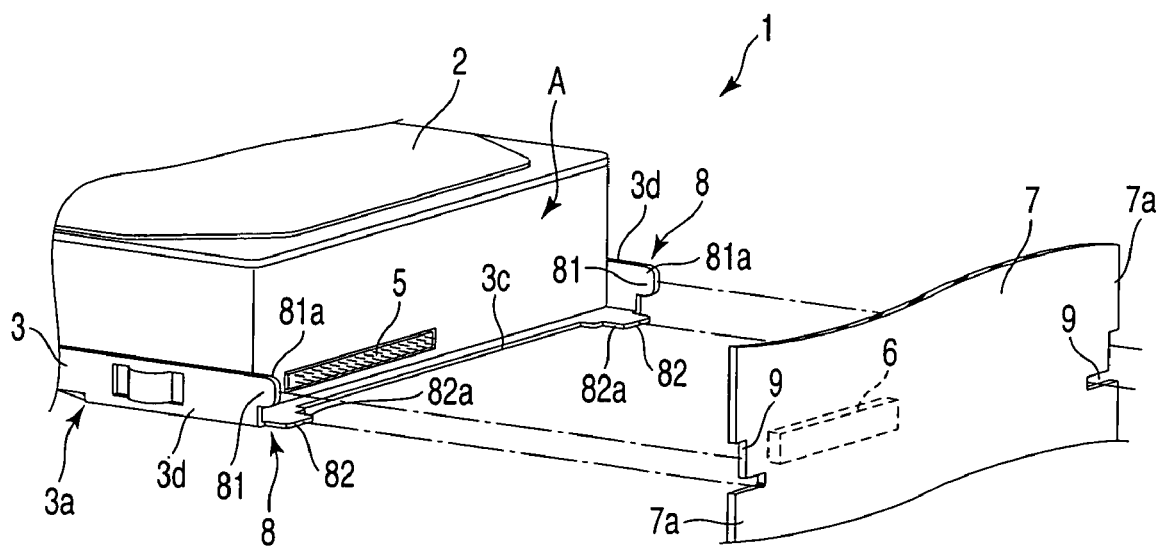
FIG. 7 is an exploded perspective view showing the engaged portion of a disk shuttle and back plane of an information processing apparatus according to a second embodiment of the present invention.
Figure 8:
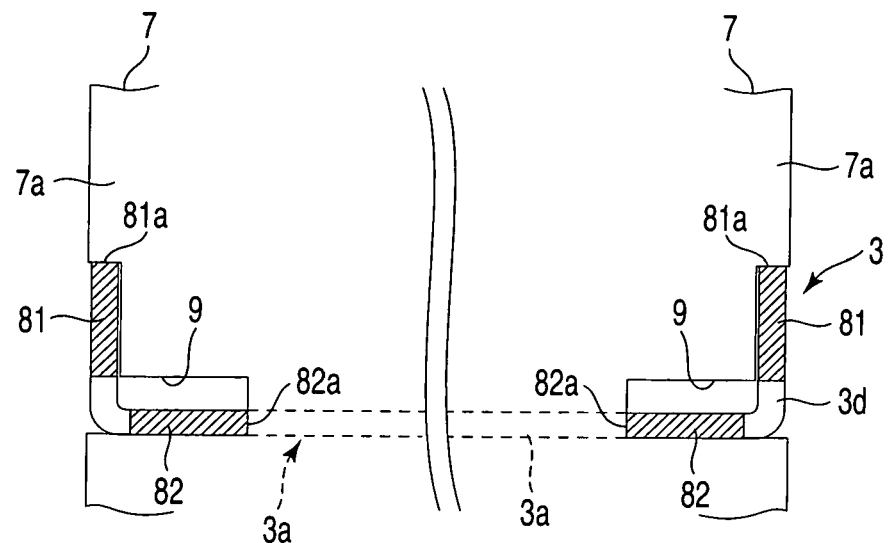
FIG. 8 is a front view of the engaged portion of the disk shuttle and back plane shown in FIG. 7, viewed from the back plane side.

As shown in FIG. 7, a tenon 8 formed in the disk shuttle 3 includes a first engagement tab 81 extended along a slide portion 3d and a second engagement tab 82 extended along the panel portion 3c. A back plane 7 has a mortise 9 formed at the position corresponding to the first and second engagement tabs 81 and 82 by cutting out the outer peripheral edge 7a. The tenon 8 is formed so that the end face 81a of the first engagement tab 81 and end face 82a of the second engagement tab 82 come into contact with the mortise 9. The end face 81a of the first engagement tab 81 is the edge opposite to the side where the slide portion 3d is connected to the panel portion 3c. The end face 82a of the second engagement tab 82 is the edge formed in the direction facing each other across the back plane 7. The first and second engagement tabs 81 and 82 may also be formed continuously like an angle iron just like the slide portion 3d and panel portion 3c.

An information processing apparatus 1 according to a third embodiment of the invention will be described with reference to FIG. 9. The components that have same functions as the information processing apparatus 1 according to the first and second embodiments will respectively applying the same reference symbols and may omit the description from followings. As a tenon 8 and a mortise 9 are different from the information processing apparatus 1 of the first and second embodiments, only these parts will be shown in the drawing.

Figure 9:
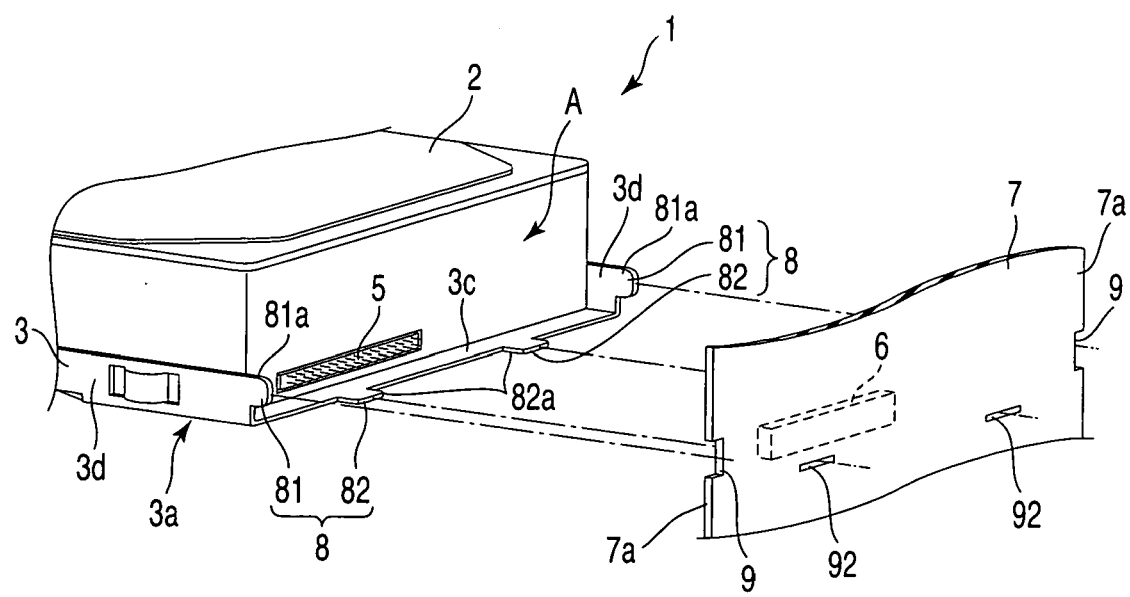
FIG. 9 is an exploded perspective view showing the engaged portion of a disk shuttle and back plane of an information processing apparatus according to a third embodiment of the present invention.

As shown in FIG. 9, a second engagement tab 82 is formed between the slide portions 3d of a disk shuttle 3, at the position close to the center of the insertion end A of a panel portion 3c. A back plane 7 has a slot 92 at the position corresponding to the second engagement tab 82. The second engagement tab 82 and slot 92 are formed so as to contact each other in the part close to the center or the outside.

In the information processing apparatus 1 shown in the second and third embodiments, the first and second engagement tabs 81 and 82 are formed on the planes crossing each other. The tenon 8 and mortise 9 (including the slot 92 in the third embodiment) are fit, thereby the movement transverse to the inserting direction of disk shuttle 3, concretely, the movement along the slide portion 3d and panel portion 3c can be restricted. When the information processing apparatus 1 is installed with the panel portion 3c set horizontal, the tenon 8 and mortise 9 can support the vertically and horizontally loads applied to the disk shuttle 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a disk shuttle to mount a magnetic disk unit;
a main body case to contain a disk shuttle;
a connector of a magnetic disk provided at the insertion end of the disk shuttle inserted from one side of the main body case;
a connector of a main body provided in the other side of the main body case and fitted with the connector of the magnetic disk;
a back plane to be fixed with the connector of the main body;
a tenon formed at the insertion end of the disk shuttle and extending toward the back plane; and
a mortise formed in the back plane to be fitted with the tenon, thereby locking the movement in the direction transverse to the inserting direction of disk shuttle.

2. The information processing apparatus according to claim 1, wherein the tenon is arranged on both sides across the inserting direction of disk shuttle.

3. The information processing apparatus according to claim 1, wherein the mortise is formed by cutting out the outer peripheral edge of the back plane.

4. The information processing apparatus according to claim 1, wherein the tenon is formed as one body with a tray to which the magnetic disk unit is fixed.

5. The information processing apparatus according to claim 4, wherein the tenon is formed in a slide portion rising continuously from both sides of the tray.

6. The information processing apparatus according to claim 4, wherein the tenon has a first engagement tab extended along the slide portion rising continuously from both sides of the tray, and a second engagement tab extended along the panel portion of the tray on which the magnetic disk unit is mounted.

7. The information processing apparatus according to claim 6, wherein the first engagement tab and second engagement tab are formed along the planes crossing each other.

8. The information processing apparatus according to claim 1, wherein the back plane is a board in which the connector of the main body is mounted.

* * * * *